(No Model.)
R. L. DE LISSER.
CENTRIFUGAL FILTER.
No. 337,050. Patented Mar. 2, 1886.
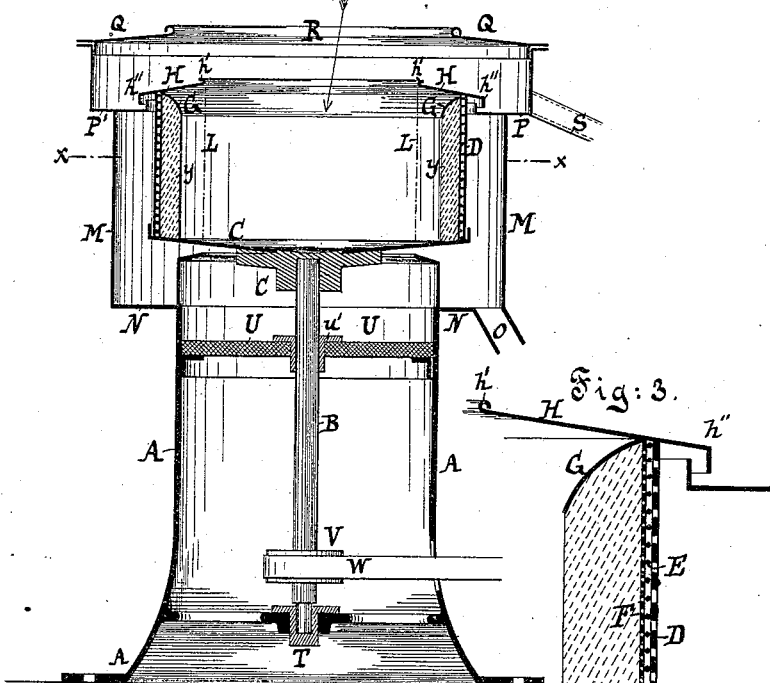
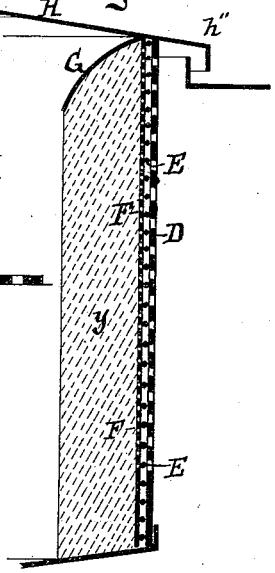
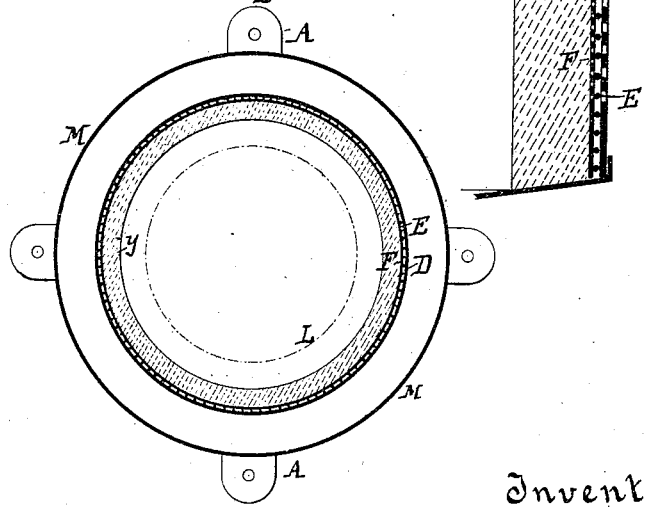
Witnesses:
John J. Cauldwell
John H. Ives
Inventor:
Richard L. De Lisser
by Phillips Abbott
his Attorney

UNITED STATES PATENT OFFICE.

RICHARD L. DE LISSER, OF BROOKLYN, NEW YORK.

CENTRIFUGAL FILTER.

SPECIFICATION forming part of Letters Patent No. 337,050, dated March 2, 1886.

Application filed November 2, 1885. Serial No. 181,583. (No model.)

*To all whom it may concern:*

Be it known that I, RICHARD L. DE LISSER, a citizen of the United States, and a resident of Brooklyn, in the county of Kings and State of New York, have invented certain new and useful Improvements in Centrifugal Filtering-Machines, of which the following is a specification.

My invention relates to improvements in centrifugal filtering-machines, and the characteristic features thereof are, first, the employment of asbestus as the filtering material; second, improvements in the construction of the basket, whereby the filtering material is held in position; third, devices which regulate the supply of liquid to the filter, whereby excess of liquid above the capacity of the machine will be at once removed therefrom, thus preventing injury to it resulting from an overcharge of liquid.

There are other advantages secured by my invention which I do not specifically enumerate.

In the accompanying drawings, the same letters indicate the same parts in all the figures.

Figure 1 illustrates a vertical section of the apparatus, part being shown in plan. Fig. 2 illustrates a horizontal section on the line $x\ x$ of Fig. 1. Fig. 3 illustrates a detailed view of the wall of the basket and filtering material.

A is a suitably-constructed metallic or wooden frame, upon which the filter is supported.

B is the shaft upon which the filter revolves.

C is the bottom of the filter. It is rigidly attached to the shaft B.

D is the outer shell of the basket. It is fastened to the bottom C, and is formed, preferably, of perforated sheet-steel of such thickness and strength as may be required, depending on the size of the filter.

Inside of the outer shell, D, I place a strong wire-netting, E. (Best seen in Fig. 3.) It is preferably made of brass wire, and inside of it still another shell of perforated sheet metal, F, preferably sheet-brass. The perforations in it are preferably finer than those in the outer shell, D. I prefer that the perforations in these plates should not extend quite to the lower edge of the shells, because it is better not to filter the liquid through the bottom parts of the filter, because of the sediment, the heavier parts whereof are apt to accumulate in the bottom of the filter. The perforations may, however, extend from the top to the bottom of the shells of the basket, if desired.

At the upper rim of the basket I secure circumferentially an inwardly-extending flange, G, which also curves downwardly at its inner part, thus producing an annular pocket-like recess beneath it entirely around the upper edge of the walls of the basket. This is done to catch and firmly hold the asbestus or other filtering material at its upper part and prevent it from working upwardly by the centrifugal action, and also to retain the compactness of the filtering material at the upper part thereof.

H is an inwardly-extending annular flange or flat ring, which is rigidly attached to the upper edge of the walls of the basket and extends both inside and outside of the same, as seen at $h'\ h''$. It extends inwardly beyond the inner face of the filtering material to such an extent as will secure a proper charge of liquid to be filtered, since the liquid will wall itself up against the filtering material on a vertical line to a thickness determined by the inner edge, $h'$, of the flange H, as seen in Fig. 1 at L. I prefer to have the thickness of this wall of liquid maintained by the inflow at about three or four inches, having secured good results thereby; but no specific thickness is required, excepting that there should not be so much liquid against the filtering material as to cause waves to arise therein, as is well understood in such structures, for, if so, wabbling of the machine and consequent fracture thereof may result. The outer edge, $h''$, of the flange H extends outwardly beyond the outer wall of the basket about three or four inches, and then preferably turns downwardly at its edge, as shown.

M is the outer casing of the filter. It is stationary and rests on the top of the frame A. At its lower part it is formed into a gutter, N, which is provided with an outlet, O.

On the upper edge of the outer casing, M, is attached a gutter, P, the inner edge whereof extends inwardly beyond the outwardly-extending part $h''$ of the flange H and curves upwardly underneath the same. On the upper edge of the gutter rests a cover, Q, the entire central part whereof is removed, as at R, for the free admission of the liquid to be filtered. I prefer that this cover should be readily removable for cleansing all parts of the filter. The gutter P is provided with an outlet pipe or opening, S, for the escape of the overflow-liquid.

The shaft B is supported on and turns in a socket-bearing, T, supported on a cross-bar of the frame A, and is supported near its upper part by an elastic bearing, U. This may be made in any preferred manner, but I find that a metallic journal, $u'$, cushioned against a yielding circumferential rubber buffer, gives good results. The yielding feature in this support is to aid in preventing wabbling of the basket at high speeds; but a rigid bearing may be used, if preferred.

V is a pulley placed on the shaft B, for the reception of a driving-belt, W. Any other suitable means for giving rotation may, however, be employed. The filtering material Y which I prefer to employ is fibrous asbestos, which has been finely divided or shredded, but not ground. This is mixed with water until it becomes a soft and quite plastic mass. Then, the machine being rotated rapidly, the asbestos is thrown into the filter, preferably a little at a time, and it will immediately, under the centrifugal action, spread itself in a perfect and smooth manner upon the inner metallic plate, F, of the wall of the basket. The asbestus should be supplied until it has attained a thickness equal to the inner edge of the flange G, and I prefer that its thickness should be about one inch.

The employment of asbestus as the filtering material when used as stated forms part of my invention. Its peculiar fibrous nature, rendering it peculiarly adapted to this use, and the facility with which it may be removed and thoroughly cleansed by burning or treatment with acids, as well known, and then broken up and again mixed with water and again applied renders it a very cheap and especially valuable material for this purpose. I do not, however, in my claims forming part of this patent limit myself to the employment of asbestus, excepting in such claims as specify it as an element.

The operation is as follows: The machine is put in motion, revolving at such speed as may be desired. The higher the speed the faster the filtering operation. The liquid is introduced at the top, as indicated by the arrow. Upon striking the bottom of the filter it is immediately thrown against the filtering material $y$ and is forced through it by the centrifugal force and through the perforations in the inner shell, F, the wire gauze or netting, and the perforations in the outer shell, D, and into the chamber between the basket and the outer casing, M; thence it falls into the gutter N and is carried off by the outlet O. If the liquid is supplied in greater quantity than will be retained by the flange H, it then passes upwardly and outwardly over the edge $h'$ of the flange H and is received in the upper gutter, P, and conducted away through the outlet P', whence it can be returned to source of supply, if valuable; if not specially so—as water—then allowed to run away through any suitable conduit.

It is obvious that the machine may be attached to brackets on a wall or be suspended by suitable hangers from a ceiling, the shaft B being supported and journaled in any suitable manner; also, that the shaft may extend upwardly from its point of attachment with the bottom of the filter instead of downwardly, and that the driving mechanism may be above the filter instead of below it.

The cover Q is not essential, but I prefer to employ it.

I do not limit myself to the details of construction shown, since many deviations therefrom may be made and still my invention be secured.

I claim—

1. The combination, in a centrifugal filtering-machine, of a revolving basket having perforated walls and a fixed flange attached to the upper edge thereof extending inwardly beyond the line of the filtering material and outwardly sufficient to discharge the overflow-liquid, substantially as and for the purposes set forth.

2. The combination, in a centrifugal filtering-machine, of a revolving basket having perforated walls, a fixed flange attached to the upper edge thereof extending inwardly beyond the line of the filtering material and outwardly sufficient to discharge the overflow-liquid, and a gutter adapted to catch and conduct away the overflow-liquid, substantially as and for the purposes set forth.

3. The combination, in a centrifugal filtering-machine, of a revolving basket having perforated walls, a fixed flange attached to the upper edge thereof extending inwardly beyond the line of the filtering material and outwardly sufficient to discharge the overflow-liquid, an outer stationary case provided with a gutter at its lower part to collect and conduct away the filtered liquid, substantially as and for the purposes set forth.

4. The combination, in a centrifugal filtering-machine, of a revolving basket having perforated walls, a fixed flange attached to the upper edge thereof extending inwardly beyond the line of the filtering material and outwardly sufficient to discharge the overflow-liquid, an outer stationary case provided with a gutter adapted to catch and conduct away the filtered liquid, and another gutter placed at or near the top of the external case adapted to catch and conduct away the overflow-liquid, substantially as and for the purposes set forth.

5. In combination with the perforated wall of a centrifugal machine, the flange G, extending circumferentially inwardly and downwardly, adapted to confine the filtering material at its upper part, substantially as and for the purposes set forth.

6. The combination, in a centrifugal filtering-machine, of a rotating perforated basket lined with filtering material, and overflow-conduit adapted to relieve the filter from excess of liquid, and a conduit to receive and conduct away the filtered liquid, substantially as and for the purposes set forth.

7. The combination, in a centrifugal filtering-machine, of a perforated rotating basket provided at its upper part with a flange or plate adapted to retain the filtering material in defined position relative to the walls of the basket, and a feed-regulating device attached to the basket, whereby the proper relation between the capacity of the filtering material and the supply of liquid will be regulated, substantially as and for the purposes set forth.

8. The combination, with a centrifugal filtering-machine, of an automatic feed-adjusting device, whereby excess of liquid will be automatically removed from the filter, substantially as and for the purposes set forth.

Signed at Brooklyn, in the county of Kings and State of New York, this 29th day of October, A. D. 1885.

R. L. DE LISSER.

Witnesses:
　G. W. DE LISSER,
　JAMES BUTLER.